Patented Nov. 17, 1936

2,060,962

UNITED STATES PATENT OFFICE 2,060,962

PRODUCTION OF PLAY BALLS

Douglas Frank Twiss, Wylde Green, Birmingham, and William McCowan, Kings Heath, Birmingham, England, assignors to Dunlop Rubber Company Limited, London, England, a British company No Drawing. Application April 6, 1934, Serial No. 719,298. In Great Britain May 19, 1933

13 Claims. (Cl. 18—58)

This invention concerns improvements in or relating to the production of play balls, as for example, tennis balls.

The object of the present invention is to produce play balls, for example, tennis balls free from seams and other irregularities.

Heretofore the inner cores or gas containers of play balls such as tennis balls have usually been produced from shaped strips of compounded rubber mixings. The handling of such strips is, however, extremely difficult and inaccurate and defective joints, with consequent leakage therefrom, are a common occurrence.

In some cases the spherical container has been formed from two hemispherical cups of compounded rubber mixings, but this does not remove the difficulties of manipulation by hand or the consequent risk of leaky joints.

Tennis balls and similarly inflated balls also suffer from leakage, which may be due to one or more of the three following causes:

1. The highly compounded nature of the rubber mixture of which the spherical gas container is formed.

2. Imperfect joints, due in a large measure to the extreme flexing of the component parts.

3. Ineffective sealing of the aperture through which gas is introduced when means, such as hypodermic needle, is employed for the purpose.

It is desirable, therefore, to be able to produce play balls, such as tennis balls, from fluid rubber or the like compositions which can be evenly distributed inside a spherical mold and subsequently solidified so as to produce a hollow rubber or the like core of even thickness and free from joints.

According to the present invention the method for the production of play balls, for example, tennis balls, comprises introducing into hollow spherical molds predetermined amounts of aqueous dispersions of the kinds hereinafter specified, closing the molds, subjecting the molds to rotation about a variable axis, and coagulating the aqueous dispersions aforesaid by subjecting the aforesaid dispersions to low temperatures.

To the aqueous emulsions or dispersions aforesaid can be added, if desired, a proportion of a water-soluble coagulant in a quantity insufficient to bring about coagulation at ordinary temperatures, or in such proportion as to have a delayed coagulating or a gelling action at ordinary temperatures.

Where aqueous emulsions or dispersions are employed containing an insufficient proportion of coagulant to cause coagulation at ordinary temperatures, such coagulation may be caused by freezing, or partly freezing, the water of the dispersing medium. The separation of ice thereby raises the concentration of the water soluble substances in the remaining liquid present including any added coagulant so that coagulation of the aqueous emulsions or dispersions aforesaid accompanies freezing.

Coagulation of the aqueous dispersions aforesaid contained within the molds can be effected by the application of freezing mixtures to the outside of the molds.

It is desirable that the molds containing the aqueous dispersions aforesaid should be subjected to rotation for some time prior to effecting the total solidification of the aforesaid aqueous dispersions, and furthermore, it is desirable that the molds should be still in rotation while solidification is taking place.

To effect even distribution of the aqueous dispersions aforesaid in the hollow spherical molds, the aforesaid molds can be rotated simultaneously about two or three axes at right angles to each other.

Approximately even distribution of the aqueous dispersions aforesaid has been obtained, for example, by placing the spherical mold containers on two cylindrical rollers revolving in the same direction, the rollers at the same time moving backwards and forwards in opposite directions to each other along their horizontal axes.

Improved distribution of the aqueous dispersions aforesaid has been obtained by subjecting the spherical mold containers to a rotary motion about three mutually normal axes.

Subsequent to coagulation of the aforesaid dispersions, the molds are opened desirably at the ordinary temperature, and the balls thoroughly dried.

Thereafter, the balls are preferably replaced in molds and vulcanized.

It is desirable that vulcanization should be effected under such conditions that the external fluid pressure on the ball, caused by leakage through the joints of the mold, is substantially less than the pressure of the ball on the mold caused by expansion of the confined air within the ball, as for example, by immersion of the mold in boiling water or by heating the mold in superheated steam.

To obtain the desired inflation of the ball, several methods can be adopted. For example, inflation may be effected by floating on the liquid aqueous dispersions aforesaid within the mold, a capsule or ampule, for example, of paraffin wax containing a gas generating composition, for example, a moist mixture of sodium nitrite and ammonium chloride. When the dried ball is placed in the mold, the latter can be heated by, for instance, immersion in boiling water, for example, 15 minutes to effect complete inflation before molding. During this heating, the capsule material is fused and allowed to flow over the inner surface of the ball, thus improving the gas-retaining properties of the latter.

Alternatively, inflation can be obtained by providing the mold with a one-way valve through which a gas at a predetermined pressure is forced into the upper part of the mold after closing and before rotation and solidification of the aqueous dispersions.

When the dispersions are subsequently solidified, the ball produced will contain gas under pressure, and in this case the ball is vulcanized without removal from the mold. Subsequent to vulcanization the ball is removed and dried in a draught of warm air.

A still further way of producing the desired inflation within the ball is to produce the ball without inflation and subsequently inflate it by storage for a period in a compressed gas, any tendency to subsequent leakage being reduced by treatment with, for instance, a rubber solution. This solution may be employed at the same time as an adhesive for securing a coating of felt or disintegrated felt or other suitable material.

Another way of producing the desired inflation within the ball is to make use of a hollow spherical mold provided with a screwed plug bearing a fine pointed wire projecting radially towards the center of the sphere. On this wire is mounted in suitable position a filling plug comprising a core of a masticated rubber-resin mixture in a covering of uncured latex rubber. When the ball is then formed, dried and vulcanized as herein described, the product will bear the filling plug on the inner surface of its wall as an integral part of its structure.

Inflation may be effected by the introduction through a hypodermic needle inserted through the filling plug of air or any other fluid medium desired.

Advantage may also be taken of this construction to introduce into the interior of the ball fluid material suitable to form a gas-retaining lining, e. g., a mixture of gelatine and glycerine, such material being distributed over the inner surface of the ball by rolling by hand or mechanically with or without the further application of heat.

The emulsions or dispersions of rubber material comprise those consisting of rubber, guttapercha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in the first instance in concentrated form.

Concentrates such as are obtained in Patent No. 1,846,164 or in British Patent No. 219,635, to which may be added any one or more of the usual known compounding ingredients, may also be employed.

Examples of substances which can be used for accelerating the coagulation of the aforesaid dispersions at low temperatures are sodium or potassium silicofluoride, calcium chloride, calcium sulphate, magnesium sulphate and zinc sulphate.

The following is an example of a method for the production of play balls according to the present invention.

*Example*

50 ccs. of compounded latex is placed in a stainless steel mold, diameter $2\frac{9}{16}$ inches, which is then closed and rolled for 40 minutes in a freezing solution at $+14°$ F. The mold is left in the freezing solution overnight, then removed and allowed to warm to room temperature before being opened. The unvulcanized ball thus obtained is allowed to dry at ordinary temperatures and is then vulcanized in a mold, diameter $2\frac{5}{16}$ inches for one hour in boiling water.

The compounded latex used in this example can contain 63% total solids of the following composition:

| | Parts by weight |
|---|---|
| Rubber | 100 |
| Sulphur | 2 |
| Zinc oxide | 1 |
| Zinc diethyldithio-carbamate | 1 |
| Mineral oil | 5 | together with a small proportion of casein and other protective colloidal material to impart the desired stability to the dispersions of the individual constituents.

What we claim is—

1. A method for the production of play balls, for example, tennis balls, which comprises introducing into hollow spherical molds predetermined amounts of aqueous dispersions of rubber material, closing the molds, subjecting the molds to rotation about a variable axis, and coagulating the aqueous dispersions aforesaid during rotation by reducing said dispersions below the freezing point of the dispersing medium.

2. A method for producing play balls which comprises placing a quantity of aqueous dispersion of rubber material, closing the molds, and rotating the molds to distribute the aqueous dispersion uniformly over the inner surface of the mold and freezing the water of the dispersion medium to cause its separation.

3. A method as claimed in claim 1 wherein the aqueous emulsions or dispersions aforesaid are admixed with a proportion of a water-soluble coagulant in a quantity insufficient to bring about coagulation at ordinary temperatures.

4. A method as claimed in claim 1 wherein the molds containing the aqueous dispersions aforesaid are subjected to rotation for some time prior to effecting the total solidification of the aforesaid aqueous dispersions.

5. A method as claimed in claim 1 wherein the molds are still in rotation while solidification is taking place.

6. A method as claimed in claim 1 wherein subsequent to coagulation of the aforesaid dispersions the molds are opened at ordinary temperature and the balls thoroughly dried.

7. A method as claimed in claim 1 wherein subsequent to coagulation of the aforesaid dispersions the molds are opened at ordinary temperature and the balls thoroughly dried, and the balls subsequent to drying are replaced in molds and vulcanized.

8. A method as claimed in claim 1 wherein subsequent to coagulation of the aforesaid dispersions the molds are opened at ordinary temperature and the balls thoroughly dried, and the balls subsequent to drying are replaced in molds and vulcanized under such conditions that the external fluid pressure on the ball caused by leakage through the joints of the mold is substantially less than the pressure of the ball on the mold.

9. A method as claimed in claim 1 wherein the molds into which predetermined amounts of aqueous dispersions of the kinds hereinbefore specified have been introduced are rotated simultaneously about two or three axes at right angles to each other.

10. A method as claimed in claim 1 wherein the desired inflation of the ball is obtained by floating on the liquid aqueous dispersions aforesaid in the mold a capsule containing a gas generating composition and when the dried ball is placed in the mold heating the latter to effect complete inflation before molding.

11. A method as claimed in claim 1 wherein inflation is obtained by providing the mold with a one-way valve through which a gas at a predetermined pressure is forced into the upper part of the mold after closing and before rotation and solidification of the aqueous dispersions aforesaid.

12. A method as claimed in claim 1 wherein inflation is obtained by providing the mold with a one-way valve through which a gas at a predetermined pressure is forced into the upper part of the mold after closing and before rotation and solidification of the aqueous dispersions aforesaid, and subsequent to inflation treating the ball with rubber solution.

13. A method as claimed in claim 1 wherein a filling plug is supported within the wall in position to be within the finished ball.

DOUGLAS FRANK TWISS.
WILLIAM McCOWAN.